(12) United States Patent
Chen et al.

(10) Patent No.: US 11,709,893 B2
(45) Date of Patent: Jul. 25, 2023

(54) SEARCH METHOD, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Yan Chen, Beijing (CN); Kai Liu, Beijing (CN); Jing Liu, Beijing (CN); Yajuan Lyu, Beijing (CN); Qiaoqiao She, Beijing (CN); Kun Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 613 days.

(21) Appl. No.: 16/685,731

(22) Filed: Nov. 15, 2019

(65) Prior Publication Data
US 2020/0192941 A1    Jun. 18, 2020

(30) Foreign Application Priority Data
Dec. 17, 2018 (CN) .......................... 201811540941.9

(51) Int. Cl.
*G06F 16/90* (2019.01)
*G06F 16/9032* (2019.01)
(Continued)

(52) U.S. Cl.
CPC ...... *G06F 16/90332* (2019.01); *G06F 16/906* (2019.01); *G06F 16/90324* (2019.01);
(Continued)

(58) Field of Classification Search
CPC ....... G06F 16/35; G06F 16/3334; G06F 40/30
See application file for complete search history.

(56) References Cited

U.S. PATENT DOCUMENTS

| 7,034,691 B1 * | 4/2006 | Rapaport | ............... | G16H 10/20 |
| | | | | 600/300 |
| 7,436,311 B2 * | 10/2008 | Rapaport | ............... | G16H 80/00 |
| | | | | 600/300 |

(Continued)

FOREIGN PATENT DOCUMENTS

| CN | 103927358 | * | 7/2014 |
| CN | 103927358 A | | 7/2014 |

(Continued)

OTHER PUBLICATIONS

Chinese Patent Application No. 201811540941.9, Office Action dated Jan. 27, 2021, 8 pages.

(Continued)

*Primary Examiner* — Daniel A Kuddus
(74) *Attorney, Agent, or Firm* — Cozen O'Connor (57) ABSTRACT

The present disclosure provides a search method, an electronic device and a storage medium, and belongs to a technical field of the Internet. The method includes: determining a first set of features corresponding to an original search statement by parsing the original search statement; obtaining each initial search result corresponding to the original search statement; determining a second set of features corresponding to an initial search result by parsing a title of the initial search result; determining a rewritten search statement corresponding to the original search statement and the initial search result by codecing the first set of features and the second set of features; and obtaining a supplementary search result corresponding to the rewritten search statement.

14 Claims, 4 Drawing Sheets

(51) Int. Cl.
  *G06N 3/02* (2006.01)
  *G06F 16/9538* (2019.01)
  *G06F 16/903* (2019.01)
  *G06F 16/906* (2019.01)

(52) U.S. Cl.
  CPC .... *G06F 16/90335* (2019.01); *G06F 16/9538* (2019.01); *G06N 3/02* (2013.01)

(56) References Cited

U.S. PATENT DOCUMENTS

| | | | | |
|---|---|---|---|---|
| 7,526,425 | B2* | 4/2009 | Marchisio | G06F 16/3338 707/999.102 |
| 8,260,785 | B2* | 9/2012 | Hogue | G06F 16/26 707/747 |
| 9,710,518 | B2* | 7/2017 | Cheng | G06F 16/245 |
| 10,445,376 | B2* | 10/2019 | Azimi | G06N 3/084 |
| 2005/0267871 | A1* | 12/2005 | Marchisio | G06F 16/3338 |
| 2006/0161457 | A1* | 7/2006 | Rapaport | G16H 10/20 705/2 |
| 2008/0097791 | A1* | 4/2008 | Alsafadi | G16H 50/20 707/999.1 |
| 2009/0271179 | A1* | 10/2009 | Marchisio | G06F 16/3338 707/999.002 |
| 2010/0131546 | A1* | 5/2010 | Mital | G06F 16/29 707/769 |
| 2011/0035403 | A1* | 2/2011 | Ismalon | G06F 16/9535 707/769 |
| 2011/0066425 | A1* | 3/2011 | Hudgins | G06Q 10/10 704/10 |
| 2012/0246155 | A1* | 9/2012 | Vadlamani | G06F 16/353 707/E17.014 |
| 2013/0060757 | A1* | 3/2013 | Myslinski | G06Q 10/10 707/E17.082 |
| 2013/0185099 | A1* | 7/2013 | Bucur | G16H 10/60 705/2 |
| 2013/0268519 | A1* | 10/2013 | Cucerzan | G06F 16/951 707/723 |
| 2014/0129246 | A1* | 5/2014 | Vdovjak | G16H 10/60 705/2 |
| 2014/0365243 | A1* | 12/2014 | Varadan | G16H 10/60 705/3 |
| 2016/0314278 | A1* | 10/2016 | Mabotuwana | G16H 30/40 |
| 2016/0378853 | A1* | 12/2016 | Mohammad | G06F 16/3344 707/706 |
| 2018/0349440 | A1 | 12/2018 | Le et al. | |

FOREIGN PATENT DOCUMENTS

| | | | |
|---|---|---|---|
| CN | 106777018 A | | 5/2017 |
| CN | 108052659 A | * | 5/2018 |
| CN | 108052659 A | | 5/2018 |
| CN | 108959531 A | | 12/2018 |
| CN | 109002500 A | | 12/2018 |
| WO | WO2006068872 A1 | * | 6/2006 |
| WO | WO2006068872 A2 | * | 6/2006 |

OTHER PUBLICATIONS

Chinese Patent Application No. 201811540941.9, English translation of Office Action dated Jan. 27, 2021, 13 pages.

* cited by examiner

SEARCH METHOD, ELECTRONIC DEVICE AND STORAGE MEDIUM

This application is based on and claims priority of Chinese Patent Application 201811540941.9, filed on Dec. 17, 2018, the entire contents of which are incorporated herein by reference.

TECHNICAL FIELD

The present disclosure relates to a technical field of the Internet, and more particularly, to a search method, an electronic device and a storage medium.

BACKGROUND

The rapid development of the Internet provides people with a new carrier for storing, processing, transmitting and using information, and network information also becomes one of main channels for people to obtain knowledge and information quickly. While including all knowledge occupied by human beings, information resources of such size also bring a problem of how to fully develop and utilize the resources to users. To solve this problem, search engines are developed to assist network users in finding information on the Internet. Specifically, a search engine collects information from the Internet by using a specific computer program according to a certain strategy. And after organizing and processing the information, the search engine provides search service for the users, and displays the information related to what the users search to the users.

With the development of information technology and artificial intelligence, search engines are also moving towards answer engines which are more intelligent, i.e., meeting the users' question-answer requirements in the simplest and most efficient manner. At present, a search engine application generally rewrites an original search question inputted by a user into a synonymous search question, and recalls a search result matched with the original search question and the synonymous search question from a question-answer base according to the original search question and the synonymous search question, so as to improve the accuracy of the search result and enlarge a coverage of the search result.

In the related art, rewriting of the original search question may be generally achieved by means of literal matching. However, for a long original search statement or a search statement containing much redundant information, this rewriting method has a poor rewriting effect, resulting in a low accuracy of the search result and affecting the user experience.

SUMMARY

The present disclosure provides a search method, a search device, an electronic device and a storage medium, so as to solve the problem that in the related art, for an original search statement with a large length or an original search statement containing much redundant information, a rewriting method of an existing search engine for the original search statement presents a poor rewriting effect which results in a low accuracy of search result and affects the user experience.

An embodiment according to an aspect of the present disclosure provides a search method, including: determining a first set of features corresponding to an original search statement by parsing the original search statement; obtaining each initial search result corresponding to the original search statement; determining a second set of features corresponding to an initial search result by parsing a title of the initial search result; determining a rewritten search statement corresponding to the original search statement and the initial search result by codecing the first set of features and the second set of features; and obtaining a supplementary search result corresponding to the rewritten search statement.

An embodiment according to another aspect of the present disclosure provides a search device, including: a first determination module, configured to determine a first set of features corresponding to an original search statement by parsing the original search statement; a first obtaining module, configured to obtain each initial search result corresponding to the original search statement; a second determination module, configured to determine a second set of features corresponding to an initial search result by parsing a title of the initial search result; a third determination module, configured to determine a rewritten search statement corresponding to the original search statement and the initial search result by codecing the first set of features and the second set of features; and a second obtaining module, configured to obtain a supplementary search result corresponding to the rewritten search statement.

An embodiment according to a further aspect of the present disclosure provides an electronic device, including: a memory, a processor and a program stored on the memory and executable on the processor, when the program is executed by the processor, the program implements the search method as described above.

An embodiment according to a still aspect of the present disclosure provides a computer readable storage medium having a computer program stored thereon, when the program is executed by a processor, the program implements the search method as described above.

An embodiment according to a still further aspect of the present disclosure provides a computer program, when the program is executed by a processor, the program implements the search method according to embodiments of the present disclosure.

The search method, the search device, the electronic device, the computer readable storage medium and the computer program according to embodiments of the present disclosure may determine a first set of features corresponding to an original search statement by parsing the original search statement, obtain each initial search result corresponding to the original search statement, and determine a second set of features corresponding to an initial search result by parsing a title of the initial search result. Further, a rewritten search statement corresponding to the original search statement and the initial search result can be determined by codecing the first set of features and the second set of features, and further a supplementary search result corresponding to the rewritten search statement can be obtained. Therefore, with the determination of the rewritten search statement corresponding to the original search statement and the initial search result, various expressions synonymous with or similar to the original search statement are obtained to supplement the initial search result, such that not only an accuracy of a search result is improved but also a coverage of the search result is enlarged, thus improving the user experience.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

DETAILED DESCRIPTION

Embodiments of the present disclosure are described below in detail, examples of the embodiments are shown in accompanying drawings, and reference signs that are the same or similar from beginning to end represent the same or similar components or components that have the same or similar functions. The embodiments described below with reference to the accompanying drawings are exemplary, are merely used to explain the present disclosure, and cannot be construed as a limit to the present disclosure.

With respect to the problem that in the related art, for an original search statement with a long length or an original search statement containing much redundant information, a rewriting method of an existing search engine for the original search statement presents a poor rewriting effect which results in a low accuracy of search result and affects the user experience, embodiments of the present disclosure provide a search method.

The search method according to embodiments of the present disclosure may determine a first set of features corresponding to an original search statement by parsing the original search statement, obtain each initial search result corresponding to the original search statement, and determine a second set of features corresponding to an initial search result by parsing a title of the initial search result. Further, the search method may determine a rewritten search statement corresponding to the original search statement and the initial search result by codecing the first set of features and the second set of features, and obtain a supplementary search result corresponding to the rewritten search statement. Therefore, with the determination of the rewritten search statement corresponding to the original search statement and the initial search result, various expressions synonymous with or similar to the original search statement are obtained to supplement the initial search result, so that the accuracy of a search result is improved and the coverage of the search result is enlarged, thus improving the user experience.

Hereinafter, the search method, the search device, the electronic device, the storage medium and the computer program provided by the present disclosure will be described in detail with reference to the drawings.

Figure 1:
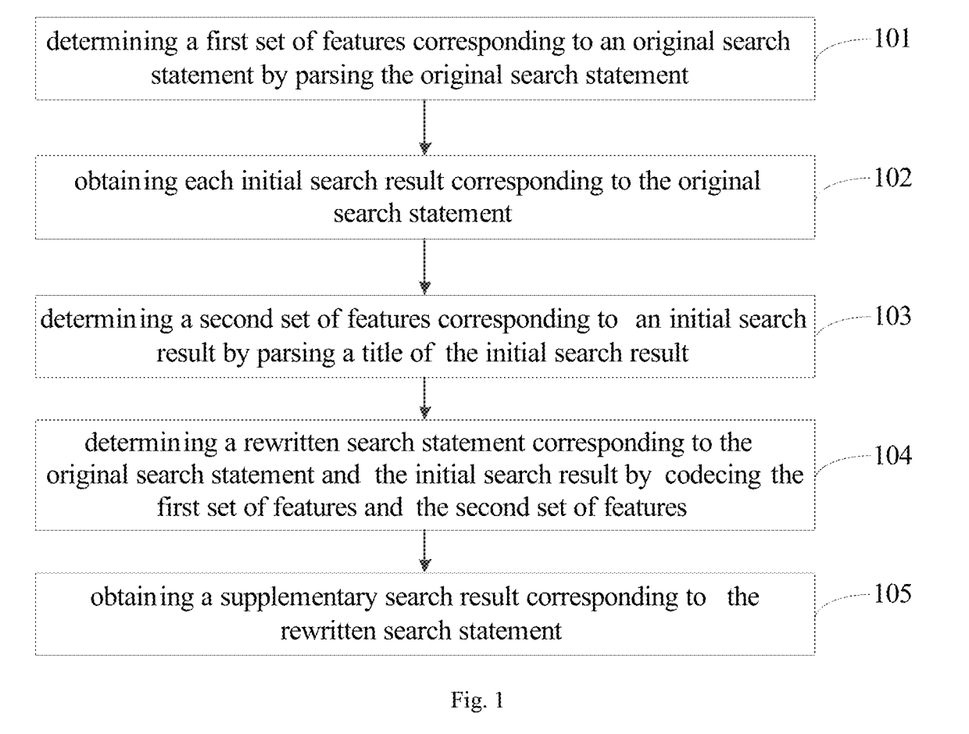
FIG. 1 is a flow chart of a search method according to an embodiment of the present disclosure.

FIG. 1 is a flow chart of a search method according to an embodiment of the present disclosure.

As illustrated in FIG. 1, the search method includes the followings.

At block 101, a first set of features corresponding to an original search statement is determined by parsing the original search statement.

The original search statement refers to an original search statement inputted by a user. The first set of features corresponding to the original search statement may include each word unit in the original search statement, and respective position feature(s), respective part-of-speech feature(s), and respective proper-noun feature(s) of the word unit(s). That is, in a possible implementation of the embodiment of the present disclosure, the act at block 101 may include: determining each first word unit contained in the original search statement and a position feature of the first word unit in the original search statement by performing word segmentation processing on the original search statement; determining a part-of-speech feature and a proper-noun feature of each first word unit by performing a lexical analysis on the first word unit; and determining the first set of features corresponding to the original search statement based on the position feature, the part-of-speech feature and the proper-noun feature of each first word unit.

It should be noted that after the original search statement inputted by the user is obtained, the word segmentation processing may be performed on the original search statement to divide the original search statement into several separate first word units. When the word segmentation processing is performed on the original search statement, the original search statement may be divided into understandable first word units according to semanteme, punctuation marks or the like. The first word unit may be a single word or a short phrase.

The position feature of the first word unit refers to position information of the first word unit in the original search statement. Supposing that the original search statement is "番茄鸡蛋汤的做法" (recipe of tomato and egg soup), and after the word segmentation processing, the search statement may be divided into four first word units: "番茄" (tomato), "鸡蛋汤" (and egg soup), "的" (of) and "做法" (recipe). The position feature of the first word unit "番茄" (tomato) is "first character".

The part-of-speech feature of the first word unit refers to the part-of-speech of the first word unit, such as noun, verb, pronoun, or quantifier. The proper-noun feature of the first word unit refers to whether the first word unit is a proper noun or not.

It should be noted that, in actual use, expressions of the position feature, the part-of-speech feature and the proper-noun feature of the first word unit may be preset according to actual needs, which are not limited in this embodiment of the present disclosure.

For example, the position feature may be expressed by numbers. For instance, when the original search statement "番茄鸡蛋汤的做法" (recipe of tomato and egg soup) is divided into four first word units, "番茄" (tomato), "鸡蛋汤" (and egg soup), "的" (of) and "做法" (recipe), after the word segmentation processing, the position feature of the first word unit "番茄" (tomato) is "1", the position feature of "鸡蛋汤" (and egg soup) is "2", and so on. The proper-noun feature may be expressed by "1" and "0". For example, when the first word unit is a proper noun, the proper-noun feature corresponding to the first word unit is "1"; and when the first word unit is not a proper noun, the proper-noun feature corresponding to the first word unit is "0".

It can be understood that after the determination of the respective position feature(s), the respective part-of-speech feature(s) and the respective proper-noun feature(s) of the first word unit(s) included in the original search statement, the first set of features corresponding to the original search statement may be determined according to each first word unit and the position feature, the part-of-speech feature and the proper-noun feature corresponding to the first word unit.

It should be noted that, in this embodiment of the present disclosure, a new statement that is synonymous with or similar to the original search statement may be generated using an encoder-decoder framework in a field of text processing. The encoder-decoder framework may generate a new statement or chapter with a word unit in an input source text. When each first word unit included in the original search statement is input into the encoder-decoder frame, by considering the position feature, the part-of-speech feature, the proper-noun feature and the like of the first word unit, the accuracy of the generated new statement may be improved.

At block 102, each initial search result corresponding to the original search statement is obtained.

At block 103, a second set of features corresponding to an initial search result is determined by parsing a title of the initial search result.

In this embodiment of the present disclosure, after the original search statement is obtained, each initial search result corresponding to the original search statement may be obtained from a question-answer base according to the original search statement. For each initial search result, a title of the initial search result may be parsed in a manner identical to that for the original search statement, i.e., determining each word unit corresponding to the title of the initial search result, and respective position feature(s), respective part-of-speech feature(s) and respective proper-noun feature(s) of the word unit(s) to form a second set of features corresponding to the initial search result.

At block 104, a rewritten search statement corresponding to the original search statement and the initial search result is determined by codecing the first set of features and the second set of features.

In this embodiment of the present disclosure, after determining the first set of features corresponding to the original search statement and the respective second set(s) of features of the initial search result(s), the first set of features and respective second set(s) of features may be input into a pointer-generator network model to be subject to codecing, so that the original search statement and each initial search statement may be rewritten to generate synonym statement(s), i.e., rewritten search statement(s), of the original search statement and the initial search statement(s).

Figure 2A:
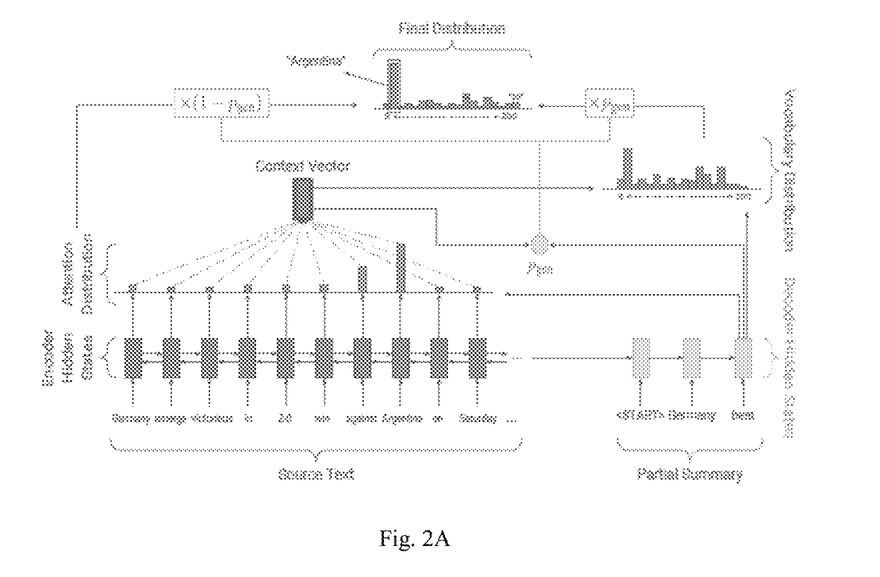
FIG. 2A is a schematic diagram of a pointer-generator network model.

FIG. 2A is a schematic diagram of a pointer-generator network model. The pointer-generator network is a main method of abstractive summarization, and the pointer-generator network model is a hybrid model of a sequence-to-sequence (seq2seq) model and a pointer network. On one hand, the pointer-generator network model may keep a capability of abstractive generation through the seq2seq model, and on the other hand, words may be directly extracted from the original text through the pointer network, so that the accuracy of a generated abstract is improved, and the problem that the seq2seq model cannot process out of vocabulary (OOV) may be alleviated.

Figure 2B:
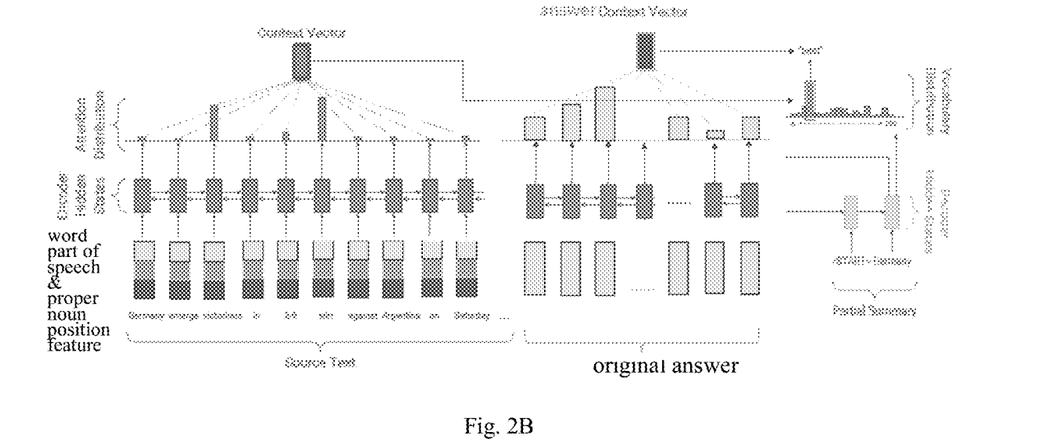
FIG. 2B is a question rewriting model based on answer context.

FIG. 2B is a question rewriting model based on answer context. In one possible implementation of this embodiment of the present disclosure, the first set of features (i.e., each first word unit included in the original search statement and the position feature, the part-of-speech feature and the proper-noun feature of the first word unit) corresponding to the original search statement and the second set of features (i.e., each word unit included in the title of an initial search result, and the position feature, the part-of-speech feature and the proper-noun feature of the word unit) corresponding to the initial search result may be used as inputs (source text and an original answer) of the pointer-generator network model. The first set of features corresponding to the original search statement and the second set of features corresponding to the initial search result may be encoded through an encoder to generate respective encoder hidden state for each first word unit included in the original search statement and each word unit included in the title of the initial search result. And then, a context vector corresponding to the original search statement and the initial search result may be generated according to the encoder hidden state and respective attention distribution of each word unit. Further, a final vocabulary distribution may be generated according to the generated context vector, and a rewritten search statement may be determined by determining a word with a maximum 'beat' value in the vocabulary distribution as a word in the rewritten search statement.

For example, the original search statement "番茄鸡蛋汤的做法" (recipe of tomato and egg soup) may be changed into a rewritten search statement "如何做番茄鸡蛋汤" (how to make tomato and egg soup) with the pointer-generator network model according to this embodiment of the present disclosure; and the original search statement "在 12306 购票 下单后, 如何使用支付宝付款" (how to pay with Alipay after placing an order at 12306), which is a long search statement without clicks, may be changed into a rewritten search statement "在 12306 中如何使用支付宝" (how to pay with Alipay in 12306) with the pointer-generator network model according to this embodiment of the present disclosure.

At block 105, a supplementary search result corresponding to the rewritten search statement is obtained.

In this embodiment of the present disclosure, for the original search statement and each initial search result, after the rewritten search statement is determined, an answer (i.e., supplementary search result) corresponding to the rewritten search statement may be obtained from the question-answer base.

Further, after the respective supplementary search result(s) of the rewritten search statement(s) is/are obtained, the initial search result and the supplementary search result may be fused and returned to the user. That is, in a possible implementation of this embodiment of the present disclosure, after the act at block 105, the method may further include: generating a search result corresponding to the original search statement by fusing the initial search result and the supplementary search result.

It should be noted that, after determining the supplementary search result corresponding to the rewritten search statement, the initial search result and the supplementary search result may be fused to remove repeated contents in the initial search result and the supplementary search result, and to generate the search result corresponding to the original search statement, thereby enlarging a coverage of the search result and removing repeated information in the search result.

For example, if the original search statement is "番茄鸡蛋汤的做法" (recipe of tomato and egg soup), and the generated rewritten search statement is "如何做番茄鸡蛋 汤" (how to make tomato and egg soup), the initial search result corresponding to the question "番茄鸡蛋汤的做法" (recipe of tomato and egg soup) and the supplementary search result corresponding to the question "如何做番茄鸡蛋汤" (how to make tomato and egg soup) may be returned to generate the search result corresponding to the original search statement, thereby expanding the influence of the original search statement.

The search method according to this embodiment of the present disclosure may determine the first set of features corresponding to the original search statement by parsing the original search statement, obtain each initial search result corresponding to the original search statement, and determine the second set of features corresponding to the initial search result by parsing the title of the initial search result. Further, the search method may determine a rewritten search statement corresponding to the original search statement and the initial search result by codeing the first set of features and the second set of features, and obtain a supplementary search result corresponding to the rewritten search statement. Therefore, with the determination of the rewritten search statement corresponding to the original search statement and the initial search result, various expressions synonymous with or similar to the original search statement are obtained to supplement the initial search result, so that the accuracy of the search result is improved and the coverage of the search result is enlarged, thus improving the user experience.

In one possible implementation of the present disclosure, each word unit in the rewritten search statement may be determined one by one according to the word units included in the original search statement and the title of the initial search result, and a candidate word unit having the highest matching degree with the word unit in the rewritten search statement is selected from a preset word list to serve as a final target candidate word unit, so as to determine the rewritten search statement.

Hereinafter, the search method according to an embodiment of the present disclosure will be further described with reference to FIG. 3.

Figure 3:
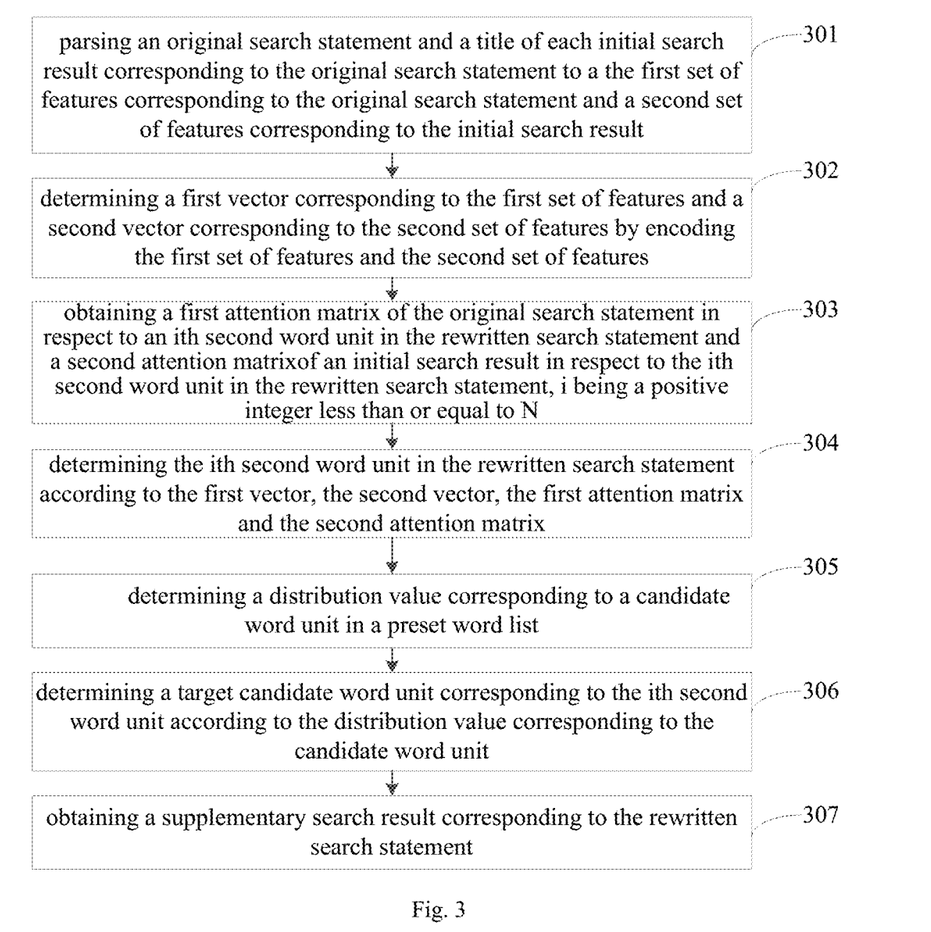
FIG. 3 is a flow chart of a search method according to another embodiment of the present disclosure.

FIG. 3 is a flow chart of a search method according to another embodiment of the present disclosure.

As illustrated in FIG. 3, the search method includes the followings.

At block 301, an original search statement and a title of each initial search result corresponding to the original search statement are parsed to determine a first set of features corresponding to the original search statement and a second set of features corresponding to the initial search result.

The specific implementation process and principle of the act at block 301 may refer to the detailed description of the above embodiments, which are not described in detail herein.

At block 302, a first vector corresponding to the first set of features and a second vector corresponding to the second set of features are determined by encoding the first set of features and the second set of features.

In one possible implementation of the embodiment of the present disclosure, an encoder in a pointer-generator network model may encode the first set of features corresponding to the original search statement, so as to generate an intermediate semantic representation, i.e., the first vector, corresponding to the original search statement, and encode respective second set(s) of features of the initial search result(s) to generate respective intermediate semantic representation(s), i.e., respective second vector(s), of the initial search result(s). Encoding processing performed on the first set of features and the second set of features may be implemented by function (1).

$$C=F(x_1, x_2, \ldots x_m) \qquad (1)$$

F is a nonlinear transformation function, $x_1, x_2 \ldots x_m$ is a set of features inputted into the model, and C is a vector generated after encoding. When $x_1, x_2 \ldots x_m$ is the first set of features corresponding to the original search statement, C is the first vector corresponding to the first set of features. When $x_1, x_2 \ldots x_m$ is the second set of features corresponding to the initial search result, C is the second vector corresponding to the second set of features.

At block 303, a first attention matrix of the original search statement in respect to an ith second word unit in the rewritten search statement and a second attention matrix of an initial search result in respect to the ith second word unit in the rewritten search statement are obtained, i being a positive integer less than or equal to N.

N is the number of the second word units included in the rewritten search statement, N being a positive integer.

It should be noted that a visual attention mechanism is a brain signal processing mechanism specific to human vision. Human vision obtains a target area needing to be focused, namely an attention focus, by rapidly scanning a global image, and then puts more attention resources on the area to acquire more detailed information of the target needing to be focused while neglecting useless information. This is a means for rapidly screening high-value information from a large amount of information by utilizing limited attention resources, and it is a survival mechanism formed in a long-term evolution of human beings. The human visual attention mechanism greatly improves the efficiency and accuracy of visual information processing. For example, when a human being sees an image, he/she will pay more attention to a face, a title of text, a first sentence of an article, or the like.

Essentially, an attention mechanism in deep learning is similar to the selective visual attention mechanism of human beings, and a core target of the attention mechanism in deep learning is also to select information which is more critical to a current task from mass information. The attention mechanism in deep learning is introduced into a text processing model to improve the accuracy of text processing.

For example, in a machine translation model, if an English sentence "Tom chase Jerry" is input into the model, the model may generate Chinese words, "汤姆" (Tom), "追逐" (chase) and "杰瑞" (Jerry) gradually. Supposing that the attention mechanism is not introduced into the model, when "Jerry" is translated into Chinese characters "杰瑞", the contribution of each English word inputted into the model to the translation into "杰瑞" is the same, which is obviously unreasonable since "Jerry" is more important for translation into "杰瑞". However, the model without the attention mechanism cannot reflect this, so that the machine translation has a poor translation effect. Particularly, when a long sentence is input, all sememe can be completely represented by an intermediate semantic vector, and the information carried by the word disappears, so that a lot of detailed information is lost, which is also an important reason for introducing the attention model into the text processing model.

Accordingly, if the attention mechanism is introduced into the translation model mentioned in the above examples, when "Jerry" is translated, it can be shown that different English words have different degrees of influence on the translation into the current Chinese character. For example, probability distribution values (Tom, 0.3), (Chase, 0.2), (Jerry, 0.5) are provided.

In this embodiment of the present disclosure, the first attention matrix of the original search statement in respect to each second word unit in the corresponding rewritten search statement and the second attention matrix of the initial search result in respect to the second word unit in the corresponding rewritten search statement may be determined. The first attention matrix of the original search statement in respect to the ith second word unit in the corresponding rewritten search statement is formed by respective attention of each first word unit in the original search statement to the ith second word unit in the rewritten search statement. The second attention matrix of the initial search result in respect to the ith second word unit in the corresponding rewritten search statement is formed by respective attention of each word unit included in the title of the initial search result to the ith second word unit in the rewritten search statement. That is, in a possible implementation of the embodiment of the present disclosure, the act at block 303 may include: obtaining an (i−1)th second word unit in the rewritten search statement; determining a first attention of each first word unit in the original search statement in respect to the ith second word unit based on an alignment probability between the first word unit in the original search statement and the (i−1)th second word unit; and determining the first attention matrix based on the first attention of each first word unit in the original search statement in respect to the ith second word unit.

It should be noted that to determine the attention matrix of the original search statement in respect to the ith second word unit in the rewritten search statement corresponding to the original search statement, the first attention of each first word unit in the original search statement in respect to the ith second word unit may be determined according to the alignment probability between the first word unit in the original search statement and the (i−1)th second word unit in the rewritten search statement, and further the first attention matrix may be determined according to each determined first attention.

In this embodiment of the present disclosure, the (i−1)th second word unit in the rewritten search statement may be obtained through an (i−1)th node $S_i$ of the decoder hidden states in the pointer-generator network, and $S_i$ and a semantic code $h_j$ (an element of the first vector) corresponding to a jth first word unit $x_j$ in the original search statement are used as parameters of a corresponding function to determine the first attention $a_j^i$ of the first word unit $x_j$ in respect to the ith second word unit, and to further determine the first attention matrix $a^i$, which may be represented by functions (2), (3) and (4).

$$e_j^i = G(h_j, s_i) \tag{2}$$

$$a_j^i = \mathrm{softmax}(e_j^i) \tag{3}$$

$$a^i = \mathrm{softmax}(e^i) \tag{4}$$

The softmax function is a normalized function to obtain attention values conforming to a value range of the probability distribution.

In a possible implementation of the embodiment of the present disclosure, $e_j^i$ may be determined by a function (5).

$$e_j^i = v^T \tan h(W_h h_j + W_s s_i + b_{attn}) \tag{5}$$

V, $W_h$, $W_s$ and $b_{attn}$ are parameters learned in a training process of the model.

It should be noted that the second attention matrix of the initial search result in respect to the rewritten search statement corresponding to the initial search result may be determined by the same method and function. In actual use, a function G may be selected according to actual needs, which is not limited in the embodiment of the present disclosure.

Further, a text generation model usually has a problem of repetition. In a possible implementation of the embodiment of the present disclosure, the problem of repetition in the model may be solved through a coverage mechanism. Specifically, a coverage vector may be maintained in a coverage model to record a coverage degree of words generated by the model in respect to a source text inputted into the model. The corresponding coverage vector when predicting the ith second word unit may be represented by a cumulative sum of attentions calculated when predicting the first (i−1)th second word units, which may be determined by a function (6).

$$c^i = \Sigma_{i'=0}^{i-1} a^{i'} \tag{6}$$

$c^i$ refers to a corresponding coverage vector when predicting the ith second word unit in the rewritten search statement, and $a^{i'}$ refers to a corresponding attention matrix when predicting the i'th second word unit in the rewritten search statement. It may be understood that $c^0$ is a zero vector since word units in the source text inputted into the model are not overwritten when predicting the first second word unit in the rewritten search statement.

In a possible implementation of the embodiment of the present disclosure, the coverage vector may be configured to influence the calculation of the attention when predicting the ith second word unit in the rewritten search statement, that is, the function (5) may be modified into a function (7).

$$e_j^i = v^T \tan h(W_h h_j + W_s s_i + W_c c_j^i + b_{attn}) \tag{7}$$

$W_c$ is a learning parameter with the same length as a vector v. $W_c$ may ensure that a current conclusion in the attention mechanism model is obtained through previous information, so as to avoid repeatedly focusing on the word unit at the same position, thereby avoiding generating repeated characters.

In a possible implementation of the embodiment of the present disclosure, a coverage loss function may be further defined to make punishment to an attention corresponding to a repeated word unit. The coverage loss may be determined by a function (8).

$$\mathrm{cov\ loss}_i = \Sigma_j \min(a_j^i, c_j^i) \tag{8}$$

cov $\mathrm{loss}_i$ is a corresponding loss function when predicting the ith second word unit in the rewritten search statement.

An overall loss function in the entire pointer-generator network model in predicting the ith second word unit in the rewritten search statement is:

$$\mathrm{loss}_i = -\log P(w^*_i) + \lambda \Sigma_i \min(a_j^i, c_j^i) \tag{9}$$

$w^*_i$ is the ith second word unit in the rewritten search statement, log $P(w^*_i)$ is a likelihood logarithm value corresponding to the ith second word unit, and $\lambda$ is a hyperparameter.

At block 304, the ith second word unit in the rewritten search statement is determined according to the first vector, the second vector, the first attention matrix and the second attention matrix.

In the embodiment of the present disclosure, after the first attention matrix and the second attention matrix are determined, each second word unit in the rewritten search statement corresponding to the original search statement may be determined according to the first vector and the first attention matrix, and each second word unit in the rewritten search statement corresponding to an initial search result may be determined according to the second vector and the second attention matrix. Specifically, the respective context vector of each second word unit may be determined according to a function (10), and each second word unit may be determined according to the context vector.

$$h^*_i = \Sigma_j a_j^i h_j \tag{10}$$

$h_j$ refers to the semantic code corresponding to a jth first word unit in the original search statement, or a semantic code corresponding to a jth word unit in the title of the initial search result. When $h_j$ refers to the semantic code corresponding to the jth first word unit in the original search statement, $a_j^i$ refers to the first attention of the jth first word unit in the original search statement in respect to the ith second word unit in the rewritten search statement corresponding to the original search statement, and $h^*_i$ refers to the context vector corresponding to the ith second word unit in the rewritten search statement corresponding to the original search statement. When $h_j$ refers to the semantic code corresponding to the jth word unit in the title of the initial search result, $a_j^i$ refers to the attention of the jth word unit in the title of the initial search result in respect to the ith second word unit in the rewritten search statement corresponding to the initial search result, and $h^*_i$ refers to the context vector corresponding to the ith second word unit in the rewritten search statement corresponding to the initial search result.

Further, the ith second word unit in each rewritten search statement may be related to the i−1 second word units in the rewritten search statement determined previously. That is, in a possible implementation of the embodiment of the present disclosure, before the act at block 304, the method may further include: obtaining first i−1 second word units in the rewritten search statement.

Correspondingly, the act at block 304 may include: determining the ith second word unit in the rewritten search statement based on the first i−1 second word units in the rewritten search statement, the first vector, the second vector, the first attention matrix and the second attention matrix.

It should be noted that when obtaining the ith second word unit in the rewritten search statement, the context vector $h^*_i$ corresponding to the rewritten search statement may be determined according to the first vector and the first attention matrix, or according to the second vector and the second attention matrix, and then the ith second word unit may be determined according to the determined context vector $h^*_i$ and the first i−1 second word units in the rewritten search statement, which may be represented by the function (11).

$$w^*_i = f1(h^*_i, w^*_1, w^*_2, \ldots, w^*_{i-1}) \tag{11}$$

At block 305, a distribution value corresponding to a candidate word unit in a preset word list is determined.

At block 306, a target candidate word unit corresponding to the ith second word unit is determined based on the distribution value corresponding to the candidate word unit.

It should be noted that the preset word list is generated when the pointer-generator network model is trained, and at each time when a second word unit is determined, the pointer-generator network model may output the respective distribution value of each candidate word unit in the preset word list in respect to the second word unit, and determine the candidate word unit with the largest distribution value as the target candidate word unit corresponding to the ith second word unit. When determining the ith second word unit in the rewritten search statement, the distribution value corresponding to a current distribution of respective candidate word unit in the preset word list may be determined through a function (12).

$$P_{vocab} = \text{softmax}(V'(V[s_i, h^*_i] + b) + b') \tag{12}$$

V, V', b and b' are all parameters learned in the training process of the model, and $P_{vocab}$ is the distribution value of a candidate word unit in the preset word list.

Further, the pointer-generator network model according to the embodiment of the present disclosure is a hybrid model of the seq2seq model and the pointer network. When the second word unit in the rewritten search statement is generated, the pointer-generator network model may not only copy the word unit from the source text inputted into the model, but also generate the word unit from the preset word list. In a possible implementation of the embodiment of the present disclosure, the probability $p_{gen}$ of generating the second word unit from the preset word list may be dynamically generated to flexibly combine the seq2seq model and the pointer network.

$$p_{gen} = \sigma(w_{h^*}^T h^*_i + w_s^T s_i + w_x^T x_i + b_{ptr}) \tag{13}$$

$w_{h^*}$, $w_s$, $w_x$ and $b_{ptr}$ are parameters learned during the training process of the model, σ is a sigmoid function, and T is the number of the second word units included in the rewritten search statement.

In this embodiment of the present disclosure, the pointer-generator network model may dynamically add the original search statement and the initial search result to the preset word list in the process of generating the rewritten search statement, and thus, the respective distribution value of each candidate word unit in the preset word list outputted by the final model may be determined by a function (14).

$$P(w) = p_{gen} P_{vocab}(w) + (1 - p_{gen}) \Sigma_{j:w_j=w} a_j^i \tag{14}$$

It should be noted that, in a possible implementation of the embodiment of the present disclosure, as in the model illustrated in FIG. 2B, the original search statement and the initial search results corresponding to the original search statement may be encoded at a source end of the model, and the rewritten search statement corresponding to the original search statement and an initial search result may be generated at an output end. Therefore, in the process of generating each second word unit in a rewritten search statement, not only the first word units in the original search statement are added to the preset word list, but also the word units in the initial search result are added to the preset word list, so that the distribution value corresponding to a candidate word unit finally output by the model is:

$$P(w) = p_w P_{vocab}(w) p_a P_{answer}(w) p_q P_{question}(w) \tag{15}$$

$p_w$, $p_a$ and $p_q$ represent the preset word list, the initial search result, a weight of the distribution value corresponding to the original search statement, respectively; and $P_{vocab}(w)$, $p_a P_{answer}(w)$ and $P_{question}(w)$ represent the distribution value corresponding to a candidate word unit in the preset word list, the distribution value corresponding to a word unit in the initial search result and the distribution value corresponding to a first word unit in the original search statement, respectively.

At block 307, a supplementary search result corresponding to the rewritten search statement is obtained.

The specific implementation process and principle of the act at block 307 may refer to the detailed description of the above embodiments, which is not described in detail herein.

The search method according to this embodiment of the present disclosure may parse the original search statement and the title of each initial search result corresponding to the original search statement to determine the first set of features corresponding to the original search statement and the second set of features corresponding to the initial search result. The search method may determine the first vector corresponding to the first set of features and the respective second vector of each second set of features by encoding the first set of features and the second set of features, obtain the first attention matrix of the original search statement and the respective second attention matrix of each initial search result in respect to the ith second word unit in a rewritten search statement, and further determine the ith second word unit in the rewritten search statement according to the first vector, the second vector, the first attention matrix and the second attention matrix. The method may determine the target candidate word unit corresponding to the ith second word unit according to the respective distribution value of each candidate word unit in the preset word list, and obtain a supplementary search result corresponding to the rewritten search statement. Consequently, by introducing the attention mechanism when determining each second word unit in the rewritten search statement, an association degree between the rewritten search statement and the original search statement is raised, so that the coverage of the search result is enlarged, the accuracy of the search result is increased, and the user experience is improved.

To perform the above embodiments, the present disclosure further provides a search device.

Figure 4:
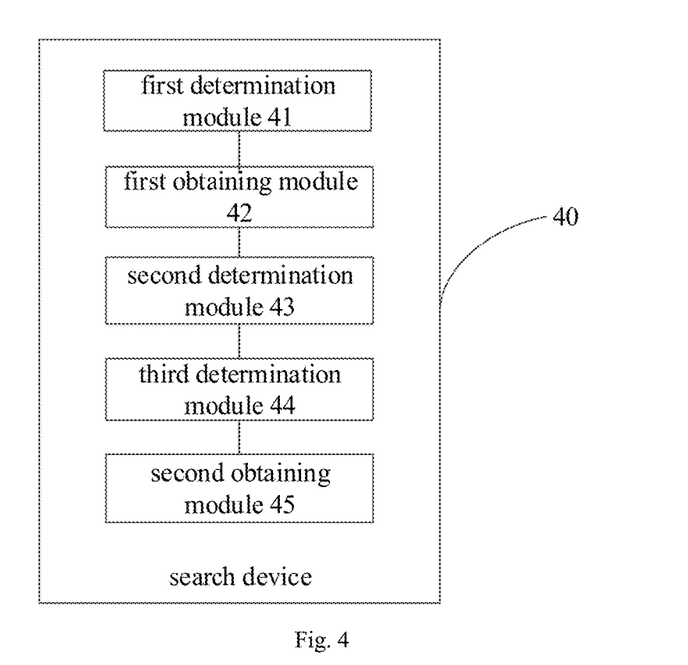
FIG. 4 is a block diagram of a search device according to an embodiment of the present disclosure.

FIG. 4 is a block diagram of a search device according to an embodiment of the present disclosure.

As illustrated in FIG. 4, the search device 40 includes: a first determination module 41, a first obtaining module 42, a second determination module 43, a third determination module 44 and a second obtaining module 45.

The first determination module 41 is configured to determine a first set of features corresponding to an original search statement by parsing the original search statement.

The first obtaining module 42 is configured to obtain each initial search result corresponding to the original search statement.

The second determination module 43 is configured to determine a second set of features corresponding to an initial search result by parsing the title of the initial search result.

The third determination module 44 is configured to determine a rewritten search statement corresponding to the original search statement and the initial search result by codecing the first set of features and the second set of features.

The second obtaining module 45 is configured to obtain a supplementary search result corresponding to the rewritten search statement.

In actual use, the search device provided by this embodiment of the present disclosure may be configured in any electronic device to execute the search method as described above.

The search device according to this embodiment of the present disclosure may determine the first set of features corresponding to the original search statement by parsing the original search statement, obtain each initial search result corresponding to the original search statement, and determine the respective second set of features of each initial search result by parsing the title of the initial search result. And then, the search device may determine a rewritten search statement corresponding to the original search statement and the initial search result by codecing the first set of features and the second set of features, and further obtain a supplementary search result corresponding to the rewritten search statement. Therefore, with the determination of the rewritten search statement corresponding to the original search statement and the initial search result, various expressions synonymous with or similar to the original search statement are obtained to supplement the initial search result, so that the accuracy of a search result is improved and the coverage of the search result is enlarged, thus improving the user experience.

In a possible implementation of the present disclosure, the first determination module 41 may be specifically configured to: determine each first word unit contained in the original search statement and a position feature of the first word unit in the original search statement by performing word segmentation processing on the original search statement; determine a part-of-speech feature and a proper-noun feature of each first word unit by performing a lexical analysis on the first word unit; and determine the first set of features corresponding to the original search statement based on the position feature, the part-of-speech feature and the proper-noun feature of each first word unit.

In a possible implementation of the present disclosure, the rewritten search statement includes N second word units, N being a positive integer. Correspondingly, the third determination module 44 is specifically configured to: determine a first vector corresponding to the first set of features and a second vector corresponding to the second set of features by encoding the first set of features and the second set of features; obtain a first attention matrix of the original search statement in respect to an ith second word unit in the rewritten search statement and a second attention matrix of the initial search result in respect to the ith second word unit in the rewritten search statement, i being a positive integer less than or equal to N; and determine the ith second word unit in the rewritten search statement based on the first vector, the second vector, the first attention matrix and the second attention matrix.

Furthermore, in another possible implementation of the present disclosure, the third determination module 44 is further configured to: obtain the first i−1 second word units in the rewritten search statement.

Correspondingly, determining the ith second word unit in the rewritten search statement is specifically implemented by: determining the ith second word unit in the rewritten search statement based on the first i−1 second word units in the rewritten search statement, the first vector, the second vector, the first attention matrix and the second attention matrix.

Furthermore, in another possible implementation of the present disclosure, the third determination module 44 is further configured to: obtain an (i−1)th second word unit in the rewritten search statement; determine a first attention of each first word unit in the original search statement in respect to the ith second word unit based on the alignment probability between the first word unit in the original search statement and the (i−1)th second word unit; and determine the first attention matrix based on the first attention of each first word unit in the original search statement in respect to the ith second word unit.

Furthermore, in another possible implementation of the present disclosure, the third determination module 44 is further configured to: determine the distribution value corresponding to a candidate word unit in the preset word list; and determine the target candidate word unit corresponding to the ith second word unit based on the distribution value corresponding to the candidate word unit.

Furthermore, in another possible implementation of the present disclosure, the search device 40 further includes: a fusion module, configured to generate a search result corresponding to the original search statement by fusing the initial search result and the supplementary search result.

It should be noted that the above explanations of the embodiments of the search method illustrated in FIGS. 1 and 3 are also applicable to the search device 40 according to this embodiment, and thus the search device 40 will be not described herein.

The search device according to this embodiment of the present disclosure may parse the original search statement and the title of each initial search result corresponding to the original search statement to determine the first set of features corresponding to the original search statement and the second set of features corresponding to the initial search result. The search device may determine the first vector corresponding to the first set of features and the respective second vector of each second set of features by encoding the first set of features and the second set of features, obtain the first attention matrix of the original search statement and the respective second attention matrix of each initial search result in respect to the ith second word unit in a rewritten search statement, and further determine the ith second word unit in the rewritten search statement according to the first vector, the second vector, the first attention matrix and the second attention matrix. The device may determine the target candidate word unit corresponding to the ith second word unit according to the respective distribution value of each candidate word unit in the preset word list, and obtain a supplementary search result corresponding to the rewritten search statement. Consequently, by introducing the attention mechanism when determining each second word unit in the rewritten search statement, an association degree between the rewritten search statement and the original search statement is raised, so that the coverage of the search result is enlarged, the accuracy of the search result is increased, and the user experience is improved.

To implement the above embodiments, the present disclosure further provides an electronic device.

Figure 5:
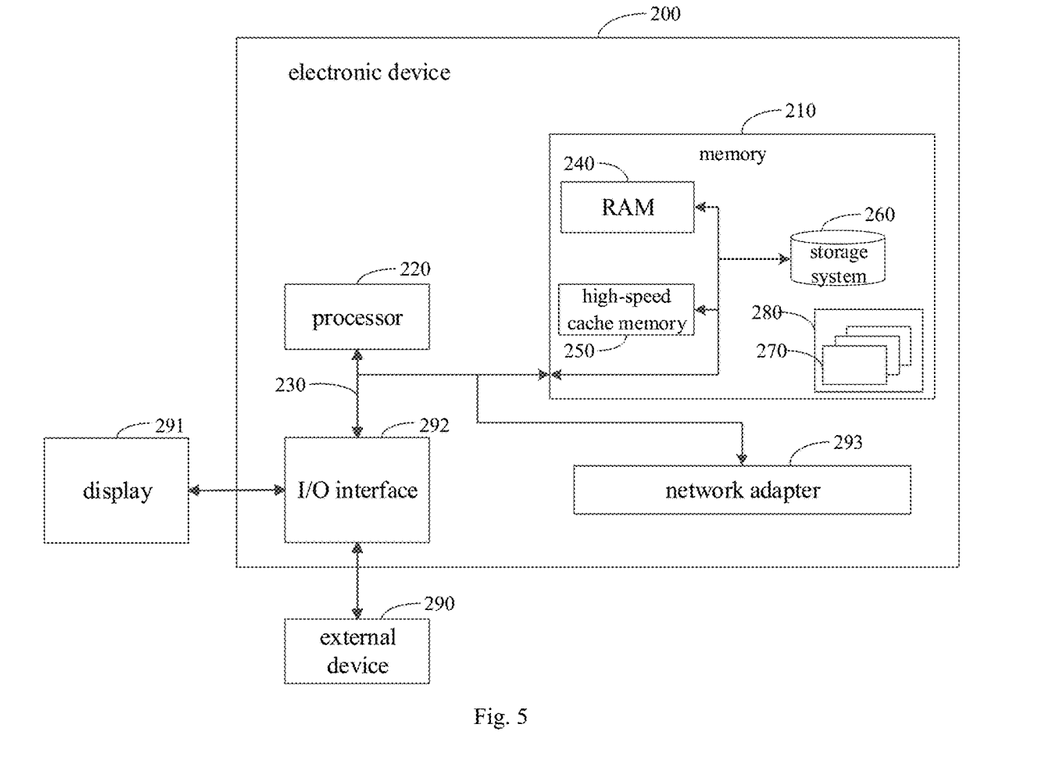
FIG. 5 is a block diagram of an electronic device according to an embodiment of the present disclosure.

FIG. 5 is a block diagram of an electronic device according to an embodiment of the present disclosure.

As illustrated in FIG. 5, the electronic device 200 includes: a memory 210, a processor 220, a bus 230 connecting different components (including the memory 210 and the processor 220). The memory 210 stores a computer program. When the program is executed by the processor 220, the program implements the search method according to embodiments of the present disclosure.

The bus 230 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the electronic device 200 may include multiple kinds of computer-readable media. These media may be any storage media accessible by the electronic device 200, including transitory or non-transitory storage medium and movable or unmovable storage medium.

The memory 210 may include a computer-readable medium in a form of volatile memory, such as a random access memory (RAM) 30 and/or a high-speed cache memory 250. The electronic device 200 may further include other transitory/non-transitory storage media and movable/unmovable storage media. In way of example only, the storage system 260 may be used to read and write non-removable, non-volatile magnetic media (not illustrated in the figure, commonly referred to as "hard disk drives"). Although not illustrated in FIG. 5, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 230 via one or more data medium interfaces. The memory 210 may include at least one program product, which has a set of (for example at least one) program modules configured to perform the functions of embodiments of the present disclosure.

A program/application 280 with a set of (at least one) program modules 270 may be stored in memory 210, the program modules 270 may include, but not limit to, an operating system, one or more application programs, other program modules and program data, and any one or combination of above examples may include an implementation in a network environment. The program modules 270 are generally configured to implement functions and/or methods described in embodiments of the present disclosure.

The electronic device 200 may also communicate with one or more external devices 290 (e.g., a keyboard, a pointing device, a display 291, and etc.) and may also communicate with one or more devices that enables a user to interact with the electronic device 200, and/or any device (e.g., a network card, a modem, and etc.) that enables the electronic device 200 to communicate with one or more other computing devices. This kind of communication can be achieved by the input/output (I/O) interface 292. In addition, the electronic device 200 may be connected to and communicate with one or more networks such as a local area network (LAN), a wide area network (WAN) and/or a public network such as the Internet through a network adapter 293. As illustrated in FIG. 5, the network adapter 293 communicates with other modules of the electronic device 200 over bus 230. It should be understood that although not shown in the figure, other hardware and/or software modules may be used in combination with the electronic device 200, which including, but not limited to, microcode, device drivers, redundant processing units, external disk drive arrays, RAID systems, tape drives, as well as data backup storage systems and the like.

The processor 220 can perform various functional applications and data processing by running programs stored in the memory 210.

It should be noted that, the implementation and the technical principle of the electronic device according to this embodiment may be referred to the foregoing explanation and description of the search method according to the embodiments of the present disclosure, and are not repeated herein.

The electronic device according to the embodiment of the present disclosure may perform the foregoing search method to determine a first set of features corresponding to an original search statement by parsing the original search statement, to obtain each initial search result corresponding to the original search statement, and to determine a second set of features corresponding to an initial search result by parsing a title of the initial search result. Further, the electronic device may determine a rewritten search statement corresponding to the original search statement and the initial search result by codecing the first set of features and the second set of features, and further obtain a supplementary search result corresponding to the rewritten search statement. Therefore, with the determination of the rewritten search statement corresponding to the original search statement and the initial search result, various expressions synonymous with or similar to the original search statement are obtained to supplement the initial search result, so that the accuracy of a search result is improved and the coverage of the search result is enlarged, thus improving the user experience.

To implement the above embodiments, the present disclosure further provides a computer readable storage medium.

The computer readable storage medium has a computer program stored thereon. When the program is executed by the processor, the program implements the search method according to the embodiments of the present disclosure.

To implement the above embodiments, the present disclosure according to another aspect provides a computer program. When the program is executed by the processor, the program implements the search method according to the embodiments of the present disclosure.

In a possible implementation, this embodiment may further adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the attached claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the attached claims.

What is claimed is:

1. A computer-implemented search method, comprising:
   determining a first set of features corresponding to an original search statement by parsing the original search statement;
   obtaining each initial search result corresponding to the original search statement;
   determining a second set of features corresponding to an initial search result by parsing a title of the initial search result;
   determining a rewritten search statement corresponding to the original search statement and the initial search result by codecing the first set of features and the second set of features; and
   obtaining a supplementary search result corresponding to the rewritten search statement;
   wherein the rewritten search statement comprises N second word units, N being a positive integer; and
   determining the rewritten search statement corresponding to the original search statement and the initial search result by codecing the first set of features and the second set of features comprises:
   determining a first vector corresponding to the first set of features and a second vector corresponding to the second set of features by encoding the first set of features and the second set of features;
   obtaining a first attention matrix of the original search statement in respect to an ith second word unit in the rewritten search statement and a second attention matrix of the initial search result in respect to the ith second word unit in the rewritten search statement, i being a positive integer less than or equal to N; and determining the ith second word unit in the rewritten search statement based on the first vector, the second vector, the first attention matrix and the second attention matrix;

wherein before determining the ith second word unit in the rewritten search statement, the method further comprises:

obtaining first i−1 second word units in the rewritten search statement; and wherein determining the ith second word unit in the rewritten search statement comprising:

determining the ith second word unit in the rewritten search statement based on the first i−1 second word units in the rewritten search statement, the first vector, the second vector, the first attention matrix and the second attention matrix.

2. The method according to claim 1, wherein parsing the original search statement comprises:

determining each first word unit contained in the original search statement and a position feature of the first word unit in the original search statement by performing word segmentation processing on the original search statement;

determining a part-of-speech feature and a proper-noun feature of each first word unit by performing a lexical analysis on the first word unit; and determining the first set of features corresponding to the original search statement based on the position feature, the part-of-speech feature and the proper-noun feature of each first word unit.

3. The method according to claim 1, wherein obtaining the first attention matrix of the original search statement in respect to an ith second word unit in the rewritten search statement and the second attention matrix of the initial search result in respect to the ith second word unit in the rewritten search statement, comprises:

obtaining an (i−1)th second word unit in the rewritten search statement;

determining a first attention of each first word unit in the original search statement in respect to the ith second word unit based on an alignment probability between the first word unit in the original search statement and the (i−1)th second word unit; and determining the first attention matrix based on the first attention of each first word unit in the original search statement in respect to the ith second word unit.

4. The method according to claim 1, wherein determining the ith second word unit in the rewritten search statement comprises:

determining a distribution value corresponding to a candidate word unit in a preset word list; and determining a target candidate word unit corresponding to the ith second word unit based on the distribution value corresponding to the candidate word unit.

5. The method according to claim 1, after obtaining the supplementary search result corresponding to the rewritten search statement, further comprising:

generating a search result corresponding to the original search statement by fusing the initial search result and the supplementary search result.

6. An electronic device, comprising a memory, a processor and a program stored on the memory and executable on the processor, wherein when the program is executed by the processor, the program implements the search method comprising:

determining a first set of features corresponding to an original search statement by parsing the original search statement;

obtaining each initial search result corresponding to the original search statement;

determining a second set of features corresponding to an initial search result by parsing a title of the initial search result;

determining a rewritten search statement corresponding to the original search statement and the initial search result by codecing the first set of features and the second set of features; and obtaining a supplementary search result corresponding to the rewritten search statement;

wherein the rewritten search statement comprises N second word units, N being a positive integer; and determining the rewritten search statement corresponding to the original search statement and the initial search result by codecing the first set of features and the second set of features comprises:

determining a first vector corresponding to the first set of features and a second vector corresponding to the second set of features by encoding the first set of features and the second set of features;

obtaining a first attention matrix of the original search statement in respect to an ith second word unit in the rewritten search statement and a second attention matrix of the initial search result in respect to the ith second word unit in the rewritten search statement, i being a positive integer less than or equal to N; and determining the ith second word unit in the rewritten search statement based on the first vector, the second vector, the first attention matrix and the second attention matrix;

wherein before determining the ith second word unit in the rewritten search statement, the program further implements:

obtaining first i−1 second word units in the rewritten search statement; and wherein determining the ith second word unit in the rewritten search statement comprising:

determining the ith second word unit in the rewritten search statement based on the first i−1 second word units in the rewritten search statement, the first vector, the second vector, the first attention matrix and the second attention matrix.

7. The electronic device according to claim 6, wherein parsing the original search statement comprises:

determining each first word unit contained in the original search statement and a position feature of the first word unit in the original search statement by performing word segmentation processing on the original search statement;

determining a part-of-speech feature and a proper-noun feature of each first word unit by performing a lexical analysis on the first word unit; and determining the first set of features corresponding to the original search statement based on the position feature, the part-of-speech feature and the proper-noun feature of each first word unit.

8. The electronic device according to claim 4, wherein obtaining the first attention matrix of the original search statement in respect to an ith second word unit in the rewritten search statement and the second attention matrix of the initial search result in respect to the ith second word unit in the rewritten search statement, comprises:

obtaining an (i−1)th second word unit in the rewritten search statement;

determining a first attention of each first word unit in the original search statement in respect to the ith second word unit based on an alignment probability between the first word unit in the original search statement and the (i−1)th second word unit; and determining the first attention matrix based on the first attention of each first word unit in the original search statement in respect to the ith second word unit.

9. The electronic device according to claim 6, wherein determining the ith second word unit in the rewritten search statement comprises:

determining a distribution value corresponding to a candidate word unit in a preset word list; and determining a target candidate word unit corresponding to the ith second word unit based on the distribution value corresponding to the candidate word unit.

10. The electronic device according to claim 6, after obtaining the supplementary search result corresponding to the rewritten search statement, the method further comprising:

generating a search result corresponding to the original search statement by fusing the initial search result and the supplementary search result.

11. A non-transitory computer readable storage medium having a computer program stored thereon, wherein when the program is executed by a processor, the program implements the search method comprising:

determining a first set of features corresponding to an original search statement by parsing the original search statement;

obtaining each initial search result corresponding to the original search statement;

determining a second set of features corresponding to an initial search result by parsing a title of the initial search result;

determining a rewritten search statement corresponding to the original search statement and the initial search result by codecing the first set of features and the second set of features; and obtaining a supplementary search result corresponding to the rewritten search statement;

wherein the rewritten search statement comprises N second word units, N being a positive integer; and determining the rewritten search statement corresponding to the original search statement and the initial search result by codecing the first set of features and the second set of features comprises:

determining a first vector corresponding to the first set of features and a second vector corresponding to the second set of features by encoding the first set of features and the second set of features;

obtaining a first attention matrix of the original search statement in respect to an ith second word unit in the rewritten search statement and a second attention matrix of the initial search result in respect to the ith second word unit in the rewritten search statement, i being a positive integer less than or equal to N; and determining the ith second word unit in the rewritten search statement based on the first vector, the second vector, the first attention matrix and the second attention matrix;

before determining the ith second word unit in the rewritten search statement, the program further implements:

obtaining first i−1 second word units in the rewritten search statement; and wherein determining the ith second word unit in the rewritten search statement comprising:

determining the ith second word unit in the rewritten search statement based on the first i−1 second word units in the rewritten search statement, the first vector, the second vector, the first attention matrix and the second attention matrix.

12. The non-transitory computer readable storage medium according to claim 11, wherein parsing the original search statement comprises:

determining each first word unit contained in the original search statement and a position feature of the first word unit in the original search statement by performing word segmentation processing on the original search statement;

determining a part-of-speech feature and a proper-noun feature of each first word unit by performing a lexical analysis on the first word unit; and determining the first set of features corresponding to the original search statement based on the position feature, the part-of-speech feature and the proper-noun feature of each first word unit.

13. The non-transitory computer readable storage medium according to claim 11, wherein obtaining the first attention matrix of the original search statement in respect to an ith second word unit in the rewritten search statement and the second attention matrix of the initial search result in respect to the ith second word unit in the rewritten search statement, comprises:

obtaining an (i−1)th second word unit in the rewritten search statement;

determining a first attention of each first word unit in the original search statement in respect to the ith second word unit based on an alignment probability between the first word unit in the original search statement and the (i−1)th second word unit; and determining the first attention matrix based on the first attention of each first word unit in the original search statement in respect to the ith second word unit.

14. The non-transitory computer readable storage medium according to claim 11, after obtaining the supplementary search result corresponding to the rewritten search statement, the method further comprising:

generating a search result corresponding to the original search statement by fusing the initial search result and the supplementary search result.

\* \* \* \* \*